No. 802,474. PATENTED OCT. 24, 1905.
A. L. RENWICK.
NUT LOCKING DEVICE FOR VEHICLES.
APPLICATION FILED AUG. 15, 1904.
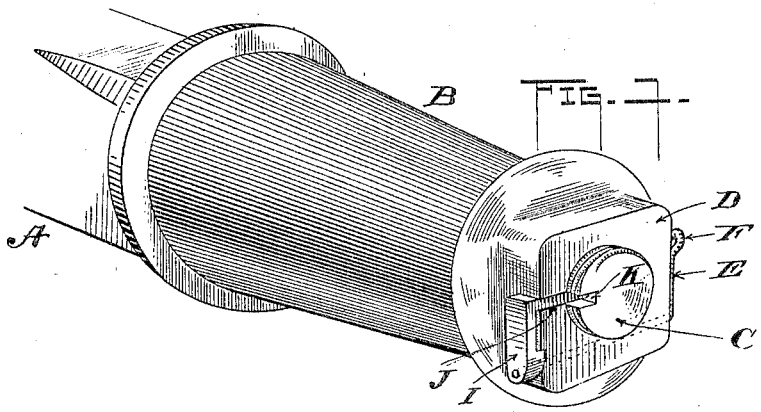
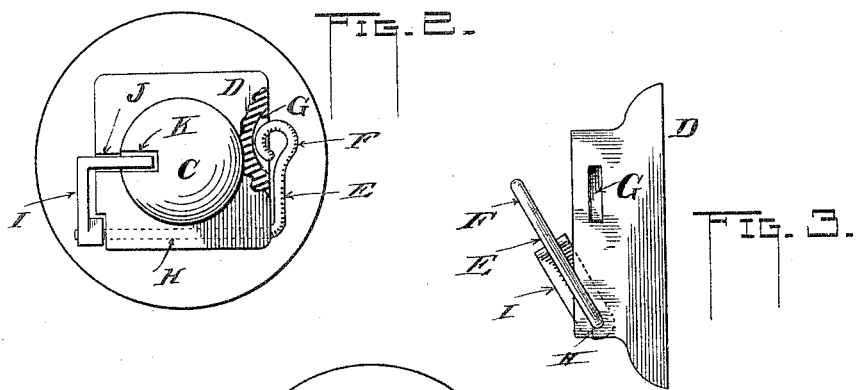
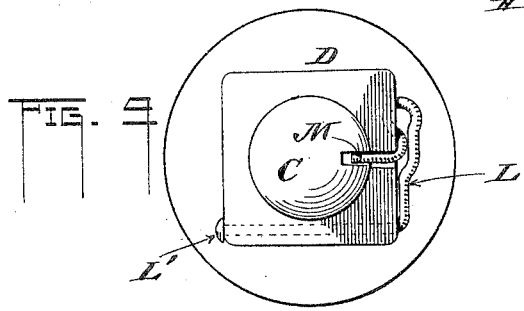
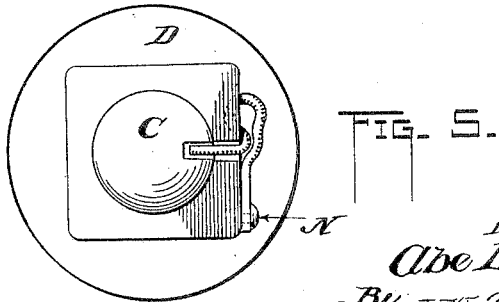
Witnesses:
Inventor.
Abe L. Renwick
By I. N. Thurlow,
atty.

UNITED STATES PATENT OFFICE.

ABE L. RENWICK, OF ELMWOOD, ILLINOIS.

NUT-LOCKING DEVICE FOR VEHICLES.

No. 802,474.  Specification of Letters Patent.  Patented Oct. 24, 1905.

Application filed August 15, 1904. Serial No. 220,766.

*To all whom it may concern:*

Be it known that I, ABE L. RENWICK, a citizen of the United States, residing at Elmwood, in the county of Peoria and State of Illinois, have invented certain new and useful Improvements in Nut-Locking Devices for Vehicles; and I do hereby declare that the following is a full, clear, and exact description of the invention, which will enable others skilled in the art to which it appertains to make and use the same.

This invention pertains to means for use in preventing the accidental unscrewing and loosing of the nuts from the axles of wagons and other vehicles.

The object of the invention is to provide simple and cheap means for attachment to the nut which holds a vehicle-wheel upon its axle.

A further object is to furnish means for the purposes described that can be instantly shifted to permit the nut being unscrewed.

A further object is to provide means of the character set forth that will positively hold the nut from turning no matter what the conditions may be.

In the accompanying drawings, Figure 1 is a perspective view of a portion of an axle, showing its skein and my improved device in place on the nut of the axle. Fig. 2 is an end view of the axle, showing my invention. Fig. 3 is an edge view of the nut, showing the device in its unlocked position. Fig. 4 is an end view of the axle, showing a modified form of the locking arrangement. Fig. 5 is a similar view showing another form of the device.

The vehicle-axle is indicated by the reference-letter A, while the skein is referred to by B. The end of the axle proper is represented at C and receives the ordinary nut D by screw-threads, as in common usage. In bringing out my invention several forms are illustrated in the figures, any one of which may be employed, as desired. In Figs. 1, 2, and 3 the same form is shown. It consists in providing a length of spring metal formed into an L-shaped member E, with a loop F formed at one end, designed when the lock is in use to enter and lie within a notch or recess G in one side of the nut, as shown. The straight extremity of the member E lies within a hole H, bored through the nut at right angles to the axle on which said nut is carried. The projecting end of E, which latter now constitutes a shaft within the bore H, is provided with an L-shaped locking member I, which is securely attached thereto in such a manner that the free end of I extends upward and inward toward the axle end C. A notch J in the nut and a corresponding notch K in the axle end permit the member I to attain a vertical position when the eye F is sprung within the notch or depression G at the opposite side of the nut. It is plainly seen that thus arranged the nut cannot possibly turn on the axle no matter what pressure or friction is brought to bear upon said nut by the hub of the wheel. It will be seen, furthermore, that by providing the end of the axle with a series of notches similar to K any nice adjustment of the nut may be had, as by that means the shake can be readily taken up, and this would be especially desirable in buggies and the like where leather washers are used, since it is often the case that when leathers are used the nut if carried up to a place where it is tight on the axle binds the wheel by means of the said leathers, or if the wheel is permitted to run free the nut is too loose and liable to jar off. In order to unlock the device, it is only necessary to grasp the eye F with the thumb and finger and spring it from its seat and then throw the arm E outward, thus also swinging out the member I. The nut can then be turned with ease.

In Fig. 4 the member L corresponds to E in Figs. 1, 2, and 3, its horizontal extension passing through the nut as before, but headed at the free end at L' to prevent it being withdrawn or falling out of the bore in which it is carried. Said member L is further provided with an inner extension M near its eye and which projects through the notch of the nut into the notch in the axle. This is a more simple form and may be used, if desired. Also in Fig. 5 the form is quite like the one last above described, except that the pivoted end of the locking member is attached to the nut, as by a screw or a stud N, formed with the nut and riveted after the member is placed thereon.

From the foregoing it will be seen that I do not wish to confine myself to any particular form of my device, since other changes may be resorted to than those shown and described.

Having described my invention, what I claim as new, and desire to secure by Letters Patent, is—

1. In combination with an axle-nut of a vehicle, a spring-arm pivoted in the nut, there being a recess in the nut for receiving and holding the said arm when locked in place to secure the nut, and a member at the opposite end of the pivoted arm for engaging the axle, there being a notch in the said axle for receiving said member substantially as described.

2. In combination with the axle-nut of a vehicle, an arm of spring metal pivoted on the nut, there being means at the nut for securing the arm in an immovable position, and a locking-arm secured to the first said arm for engaging the axle, there being a notch in the latter for receiving said second arm as set forth.

3. In combination with the axle-nut of a vehicle, the arm E of spring metal bent at right angles, its one end being held from movement by the nut, the opposite end being pivoted in the nut, and a locking member secured to the said opposite end for engaging the axle and preventing the nut turning, there being a notch in said axle for receiving said locking member.

4. In combination with the axle-nut of a vehicle, the arm E pivoted to the nut, there being a notch G in the nut for receiving the free end of said arm, the L-shaped member I affixed to the opposite end of the said arm E and engaging the axle, there being a notch K in the latter for receiving said arm all for the purposes described.

In testimony whereof I affix my signature in presence of two witnesses.

ABE L. RENWICK.

Witnesses:
   E. J. ABERSOL,
   L. M. THURLOW.